US011125908B2

(12) United States Patent
Hess et al.

(10) Patent No.: US 11,125,908 B2
(45) Date of Patent: Sep. 21, 2021

(54) EDM DATA COMPATIBILITY FOR EXTERNAL APPLICATIONS

(71) Applicant: Landmark Graphics Corporation, Houston, TX (US)

(72) Inventors: Joe Eli Hess, Richmond, TX (US); Keith David Romaine, Sugar Land, TX (US)

(73) Assignee: Landmark Graphics Corporation, Houston, TX (US)

(*) Notice: Subject to any disclaimer, the term of this patent is extended or adjusted under 35 U.S.C. 154(b) by 499 days.

(21) Appl. No.: 15/544,998

(22) PCT Filed: Jun. 28, 2016

(86) PCT No.: PCT/US2016/039839
§ 371 (c)(1),
(2) Date: Jul. 20, 2017

(87) PCT Pub. No.: WO2018/004540
PCT Pub. Date: Jan. 4, 2018

(65) Prior Publication Data
US 2018/0224571 A1    Aug. 9, 2018

(51) Int. Cl.
*G06F 16/00*     (2019.01)
*G01V 11/00*     (2006.01)
(Continued)

(52) U.S. Cl.
CPC ............ *G01V 11/00* (2013.01); *G06F 16/258* (2019.01); *G06F 16/86* (2019.01); *G06Q 10/063* (2013.01);
(Continued)

(58) Field of Classification Search
CPC ....... G06F 16/258; G06F 16/86; G01V 11/00; G06Q 10/06311
See application file for complete search history.

(56) References Cited

U.S. PATENT DOCUMENTS

2005/0234969 A1* 10/2005 Mamou ................. G06F 16/254
2008/0208476 A1*  8/2008 Karami ................... E21B 43/00
                                                                 702/6
(Continued)

FOREIGN PATENT DOCUMENTS

WO    2014031186 A1    2/2014
WO    2014077804 A1    5/2014
(Continued)

OTHER PUBLICATIONS

Tore Fjagesund, SPE, Wellbarrier, "Using Schematics for Managing Well Barriers", Sep. 1, 2015, Wellbariier, vol. 67, Issue 9, pp. 1-6.*
(Continued)

*Primary Examiner* — Leslie Wong
(74) *Attorney, Agent, or Firm* — Kilpatrick Townsend & Stockton LLP

(57) ABSTRACT

A method includes obtaining, using multiple internal well-modeling applications, data from an engineer's data model (EDM) database. The method further includes deriving data relevant to an external application from at least a first portion of the obtained data. The method further includes formatting the derived data and at least a second portion of the obtained data, relevant to the external application, to be compatible with the external application. The method further includes sending the formatted data to the external application or a user of the external application. The method further includes receiving results of processing the formatted data by the external application or the user of the external application. The method further includes storing the results in the EDM database.

20 Claims, 5 Drawing Sheets

(51) Int. Cl.
  *G06F 16/84*  (2019.01)
  *G06F 16/25*  (2019.01)
  *G06Q 10/06*  (2012.01)
  *G06Q 50/02*  (2012.01)

(52) U.S. Cl.
  CPC ....... *G06Q 10/06311* (2013.01); *G06Q 50/02* (2013.01)

(56) References Cited

U.S. PATENT DOCUMENTS

| | | | | |
|---|---|---|---|---|
| 2011/0161133 | A1* | 6/2011 | Staveley | E21B 44/00 705/7.28 |
| 2012/0026002 | A1* | 2/2012 | Vu | E21B 47/00 340/854.6 |
| 2013/0083031 | A1* | 4/2013 | Lehnherr | G06Q 10/06 345/440 |
| 2013/0339404 | A1* | 12/2013 | Chao | G06F 16/258 707/821 |
| 2014/0083688 | A1* | 3/2014 | Rojas | E21B 44/00 166/250.01 |
| 2015/0029034 | A1* | 1/2015 | Abbassian | E21B 44/00 340/853.2 |
| 2016/0098502 | A1* | 4/2016 | Havre | E21B 43/00 703/9 |
| 2016/0187490 | A1* | 6/2016 | Anghelescu | G01S 19/51 701/461 |
| 2016/0358120 | A1* | 12/2016 | Moore | G06Q 10/08 |
| 2017/0006135 | A1* | 1/2017 | Siebel | G06F 8/10 |
| 2018/0096001 | A1* | 4/2018 | Soza | G06F 16/2358 |

FOREIGN PATENT DOCUMENTS

| | | |
|---|---|---|
| WO | 2015034541 | 3/2015 |
| WO | 2015054155 A1 | 4/2015 |
| WO | 2015137963 | 9/2015 |
| WO | 2015167424 A1 | 11/2015 |

OTHER PUBLICATIONS

European Patent Office, Supplementary European Search Report, Application No./Patent No. 16907510.8-1222 / 3449090 PCT/US2016039839, pp. 1-4, Aug. 7, 2019, Munich, Germany.
Jeff Davies, David Schorow, Samrat Ray and David Reiber, The Definitive Guide to SOA-Oracle Service Bus, Second Edition, 2008, ISBN: 978-1-4302-1057-3, Pages—Table of Contents, xxi-xxiii, 5-7, 9-12,197-199, Apress, United States of America.
Wikipedia: "Wellsite Information Transfer Specification", Internet Article, Feb. 9, 2013 (Feb. 9, 2013), XP055609742, Retrieved from the Internet: URL:https://en.wikipedia.org/w/index.php?t itle= Wellsite Information Transfer Specification&oldid=537311426— [retrieved on Jul. 30, 2019] p. 1.
Wikipedia: "Wellsite information transfer standard markup language", Internet Article, Mar. 24, 2016 (Mar. 24, 2016), XP055609744, Retrieved from the Internet: URL:https://en.wikipedia.org/w/index. php?t itle=Wellsite information transfer standard markup language &oldid=711785603—[retrieved on Jul. 30, 2019] p. 1-p. 3.
International Searching Authority, Patent Cooperation Treaty, International Search Report and Written Opinion, International application No. PCT/US2016/039839, entire document, which is a PCT parent to the instant application, Mar. 14, 2017.
"Getting Started With IBM Websphere Cast Iron Cloud Integration", IBM Redbooks, Vervante, XP055669067, Jan. 11, 2012, 2 pages.
EP16907510.8 , "Office Action", dated Feb. 24, 2020, 7 pages.
Jefford et al., "Professional BizTalk Server 2006", Wrox, XP055494900, May 7, 2007, 5 pages.
Knight et al., "Professional Microsoft SOL Server 2014 Integration Services", John Wiley & Sons Incorporated, XP055669000, Apr. 21, 2014, 9 pages.
Seroter et al., "SOA Patterns with BizTalk Server 2013 and Microsoft Azure", Packt Publishing, XP055532468, Jun. 30, 2015, 4 pages.
European Application No. EP16907510.8 , Office Action, dated Jun. 24, 2020, 5 pages.
Hasan et al., "Expert Service-Oriented Architecture in C# 2005, Second Edition", Apress, XP055706563, Aug. 16, 2006, 7 pages.

* cited by examiner

EDM DATA COMPATIBILITY FOR EXTERNAL APPLICATIONS

BACKGROUND

In the oil and gas industry, an engineer's data model ("EDM") is a database service suitable for storing field data in a central repository. Entities needing access to the EDM generally have to coordinate with an internal team that controls access to the EDM. The internal team may use applications (called internal applications) to retrieve data from the EDM. These internal applications are not available to customers, partners, vendors, or other entities external to the company. Where such external entities require EDM data for an external application, they are generally forced to obtain such data manually from reports and materials provided by the internal team, resulting in numerous inefficiencies.

First, the time required for manual entry is significant because a large amount of EDM data is typically required by the external application. Second, errors due to transcription mistakes are significantly more probable, if not inevitable, due to manual entry. Third, because the internal team controls access to the EDM, the external entity must wait on the internal team to service irregular requests, provide routine support, and the like, while the internal team is obligated to devote time and resources to provide such service and support. Finally, for iterative simulations requiring EDM data, an increase in the number of iterations—ostensibly to increase the quality of the results—significantly increases the time required to obtain those results and increases the probability of error because manual entry must be performed for each iteration and person-to-person communication is required for each iteration.

Moreover, these inefficiencies on both the internal and external side, if continued, lead to disruption in the working relationship between the internal team and external entity.

BRIEF DESCRIPTION OF THE DRAWINGS

Accordingly, to increase efficiencies in the use of engineer's data models ("EDMs") and to prevent disruption in the working relationship between internal and external parties, EDM data compatibility systems and methods are disclosed herein. In the following detailed description of the various disclosed embodiments, reference will be made to the accompanying drawings in which.

Figure 1:
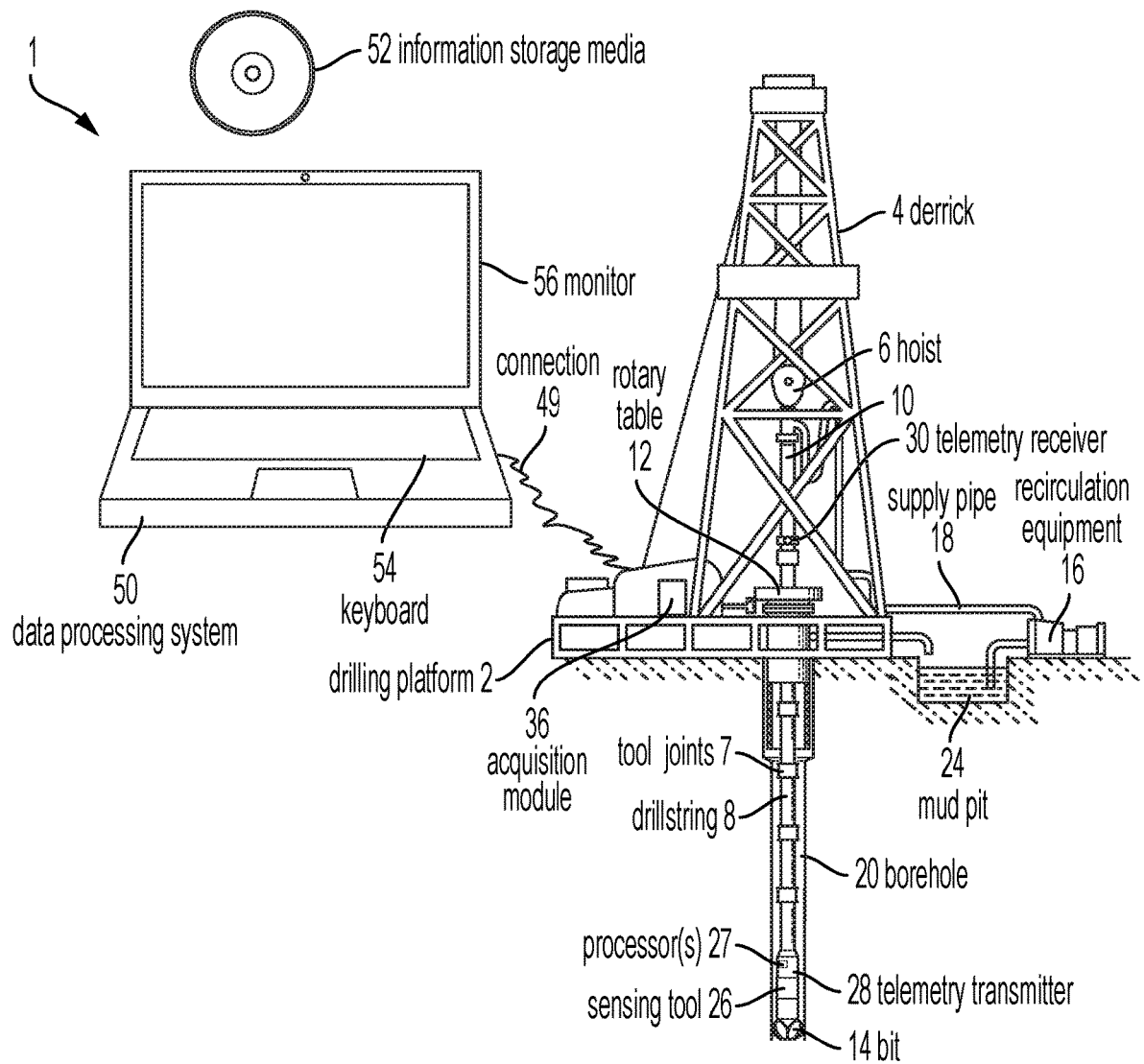
FIG. 1 is a contextual view of an illustrative logging while drilling environment used to collect EDM data.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

The issues identified in the background are at least partly addressed by systems and methods providing engineer's data model ("EDM") compatibility. By using a consistent data link between internal applications with access to EDM data and external applications requiring EDM data, human error will be eliminated, redundancy and timing inefficiencies will be mitigated, and relationship disruption will be precluded.

An EDM is a platform that manages the broadest range of well data in one database for well modeling or simulation. The data may include characteristics of specific wells such as hole size, casing size, water depth, measured depth, true vertical depth, and the like. The data may also include casing and cement characteristics such as the location of the string top or bottom, weight, grade, thread, outer diameter size, and the like. Additionally, the data may include fluid characteristics such as type, density, and the like. Finally, the data may also include pressures and test results such as pump pressure, leak-off test results, formation integrity test results, casing test results, and the like. Such data may be gathered from various sources including downhole sensors, surface sensors, offset well sensors, and published sources.

Figure 2:
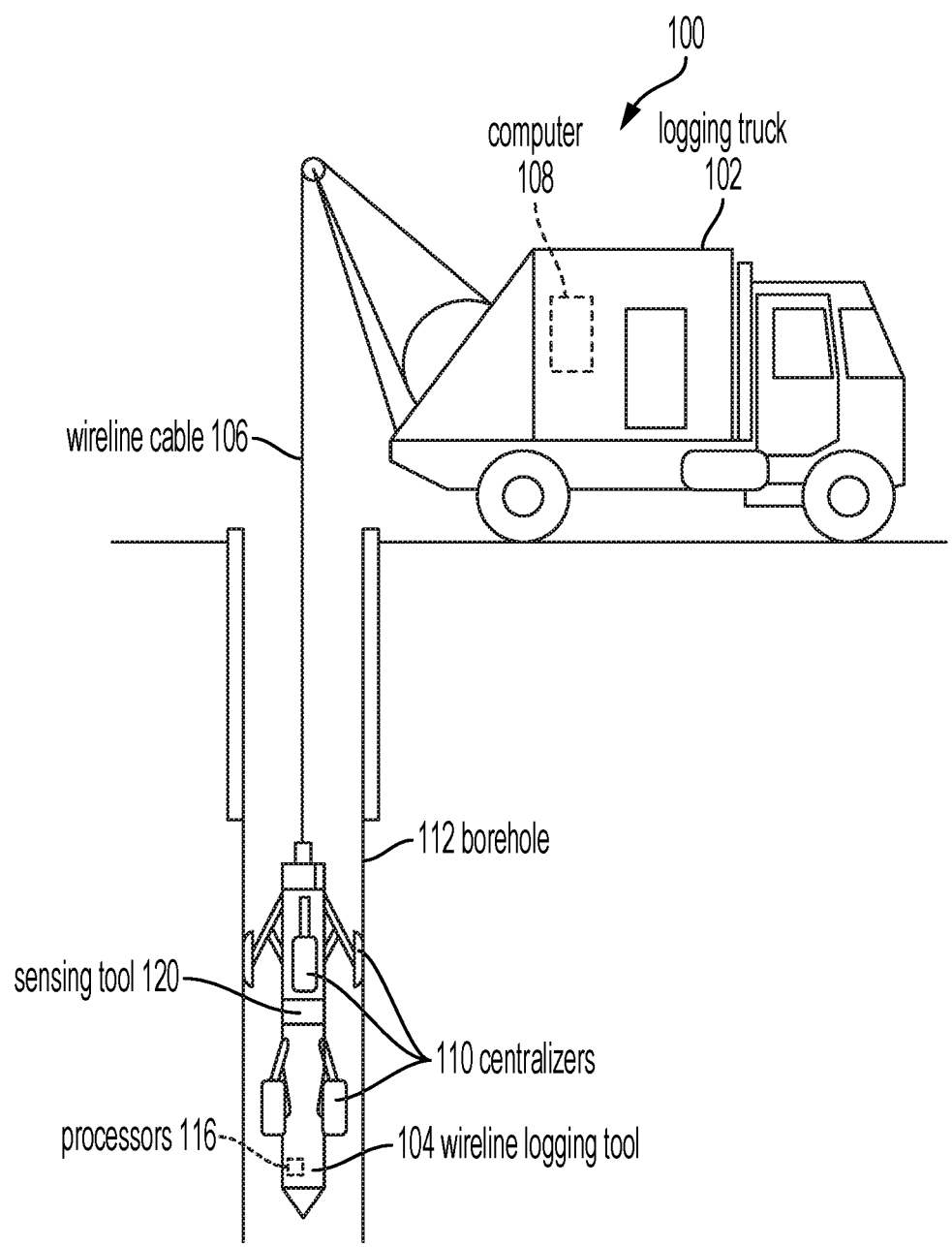
FIG. 2 is a contextual view of an illustrative wireline embodiment used to collect EDM data.

The EDM may also incorporate data management tools and enterprise-grade security to protect the well model. Using an EDM enables internal and external parties to make critical well construction and engineering decisions as the number and complexity of wells being drilled, and volume of data each well generates, continues to grow. Specifically, an EDM provides a single location for common information across drilling applications, allowing engineers to move from application to application during their workflow but access the same data set. An EDM may provide a common menu structure and options, along with single-user login to enforce a common security model, to unify and ease access to proprietary information by multiple engineers with different levels of access authorization. In so doing, an EDM enables engineers to spend more time analyzing data rather than manipulating or formatting data for later analysis. FIGS. 1 and 2 illustrate how such data may be collected.

To illustrate a context for the disclosed systems and methods, FIG. 1 shows a well during drilling operations that includes a system 1 for collecting and storing EDM data coupled to a sensing tool 26 and one or more processors 27 (located downhole as shown, at the surface, or both). A drilling platform 2 is equipped with a derrick 4 that supports a hoist 6. The platform 2 may be located offshore for subsea drilling or on-shore for subsurface drilling. Drilling of oil and gas wells is carried out by a string of drill pipes connected together by "tool" joints 7 so as to form a drill string 8. The hoist 6 suspends a kelly 10 that lowers the drill string 8 through a rotary table 12. Connected to the lower end of the drill string 8 is a drill bit 14. The bit 14 is rotated and drilling of the borehole 20 is accomplished by rotating the drill string 8, by use of a downhole motor near the drill bit, or by both methods.

Drilling fluid, termed mud, is pumped by mud recirculation equipment 16 through a supply pipe 18, through the kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For a logging while drilling ("LWD") environment, downhole sensors are located in the drillstring 8 near the drill bit 14. The sensors may include directional instrumentation and LWD tools. The directional instrumentation measures the inclination angle, the horizontal angle, and the azimuthal angle (also known as the rotational or "tool face" angle) of the LWD tools. Such measurements may be combined with motion and/or distance measurements to determine the borehole trajectory. In addition, the sensors typically measure properties of the formation and the borehole, including natural radiation, resistivity, sound velocity, density, porosity, borehole diameter, rugosity, and other such measurements.

In some embodiments, downhole sensors are coupled to a telemetry transmitter 28 that transmits telemetry signals by modulating the mud flow in drill string 8. A telemetry receiver 30 is coupled to the kelly 10 to receive transmitted telemetry signals. Other telemetry transmission techniques may also be used. The receiver 30 communicates the telemetry to an acquisition module 36 coupled to a data processing system 50.

The data processing system 50 may be coupled to a measurement unit on the platform 2 by a wired connection 49 or wireless connection, and may periodically obtain measurement data from the measurement unit as a function of position and/or time. Among other things, the system 50 processes data received from the acquisition module 36 and generates a representative display for the driller to perceive. Software (represented by information storage media 52) may run on the data processing system 50 to collect the data and organize it in a file or database stored on non-transient information storage media. For example, the collected measurement data may be stored as EDM data in an EDM database for well modeling. The operations implemented by data processing system 50 are implemented by software stored in memory and executed by one or more processors coupled to the memory. The software may respond to user input via a keyboard 54 or other input mechanism to display data as an image or movie on a monitor 56 or other output mechanism. The software may process the data to model well data and control access to the EDM database as described below. The data processing system 50 may be at the surface or partially located downhole within a protective housing to provide real-time EDM data. In some embodiments, processors both at the surface and downhole may work together or independently to obtain, store, and process measurement data.

FIG. 2 shows a contextual view of an illustrative wireline embodiment that includes a system 100 for collecting and storing EDM data coupled to a sensing tool 120 and one or more processors 116 (located downhole, at the surface, or both). A logging truck 102 may suspend a wireline logging tool 104 on a wireline cable 106 having conductors for transporting power to the tool 104 and telemetry from the tool 104 to the surface. The tool 104 may include depth sensors, temperature sensors, pressure sensors, inductive sensors, ultrasonic sensors, and the like that collect downhole measurements for inspection and evaluation of tubing, cement, and formation. Centralizers 110 may stabilize the tool 104 within the borehole 112.

On the surface, a computer 108 acquires and stores measurement data from the tool 104 as a function of axial position along the borehole 112 and optionally as a function of azimuth. Though shown as an integrated part of the logging truck 102, the computer 108 can take different forms including a tablet computer, laptop computer, desktop computer, and virtual cloud computer, and the computer 108 executes software to carry out necessary processing and enable a user to view and interact with a display of the resulting information.

Specifically, a processor coupled to memory and located at the surface may execute the software. The software may collect the data and organize it in a file or database stored on non-transient information storage media. For example, the collected measurement data may be stored as EDM data on an EDM database. Additionally, the software may respond to user input via a keyboard or other input mechanism to display data as an image or movie on a monitor or other output mechanism such as a printer. Furthermore, the software may process the data to model well data and control access to the EDM database as described below. In this way, a multi-dimensional representation of the surrounding formation, tubings, and casing may be obtained, processed, and displayed. In addition, the software may issue an audio or visual alert to direct the user's attention to a particular location, result, or piece of data.

In at least one embodiment, the tool 104 itself may include the processor coupled with memory to obtain, store, and process measurement data downhole and provide real-time EDM data. In another embodiment, processors both at the surface and downhole may work together or independently to obtain, store, and process measurement data.

Figure 3:
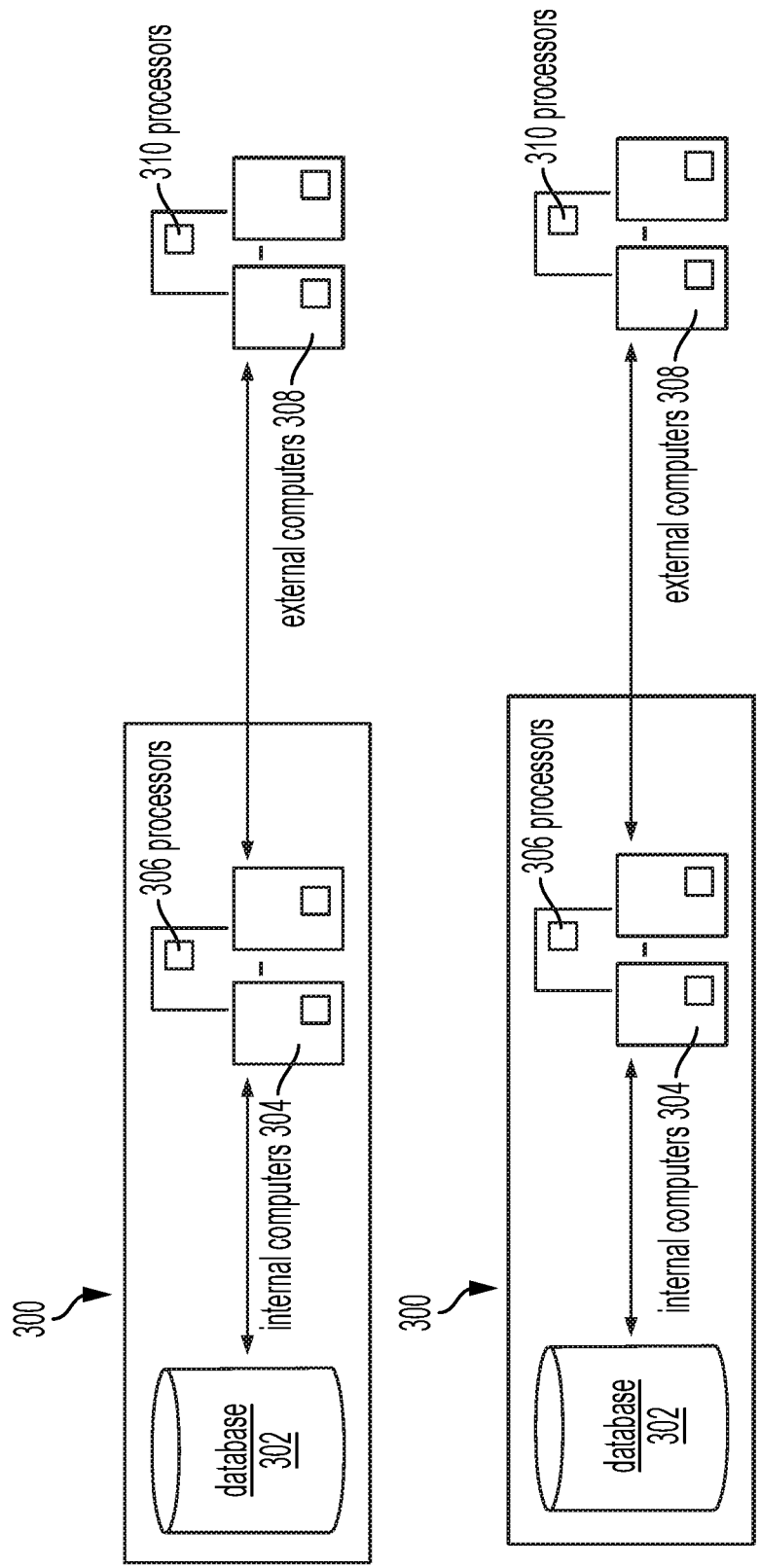
FIG. 3 is architecture of an illustrative EDM data compatibility system.

Once collected, the data regarding the borehole and surrounding formations may be stored, processed, and formatted using the illustrative EDM and data compatibility system 300 shown in FIG. 3. System 300 includes an EDM database 302, which may be implemented on a storage area network, network-attached storage, direct-attached storage, distributed servers, cloud storage services, and the like. The EDM database 302 communicates with one or more internal computers 304 included in the system 300, and the internal computers 304 may be implemented as single-processor computers, distributed-processing computers, multi-core computers, a network of computers, and the like. Accordingly, the database 302 and the internal computers 304 may be co-located in the same room or building, or the two subsystems 302, 304 may reside hundreds, if not thousands, of miles apart.

The internal computers 304 include one or more processors 306 that run one or more internal well-modeling applications, which access the EDM database 302 to obtain EDM data. The internal applications may include Compass, WellPlan, StressCheck, OpenWells, CasingWear, Wellcat, and the like. The internal computers 304 communicate with external computers 308, which may be similarly implemented as single-processor computers, distributed-processing computers, multi-core computers, a network of computers, and the like. The external computers 308 include one or more processors 310 that run one or more external applications, which may include well-analysis applications, metallurgy applications, and the like. For example, the external applications may include Well Barrier, Socrates, Predict, and the like. Typically, the internal computers 304 are not co-located with the external computers 308. The external applications require data from the EDM database 302, and FIG. 4 illustrates how such data is provided.

Figure 4:
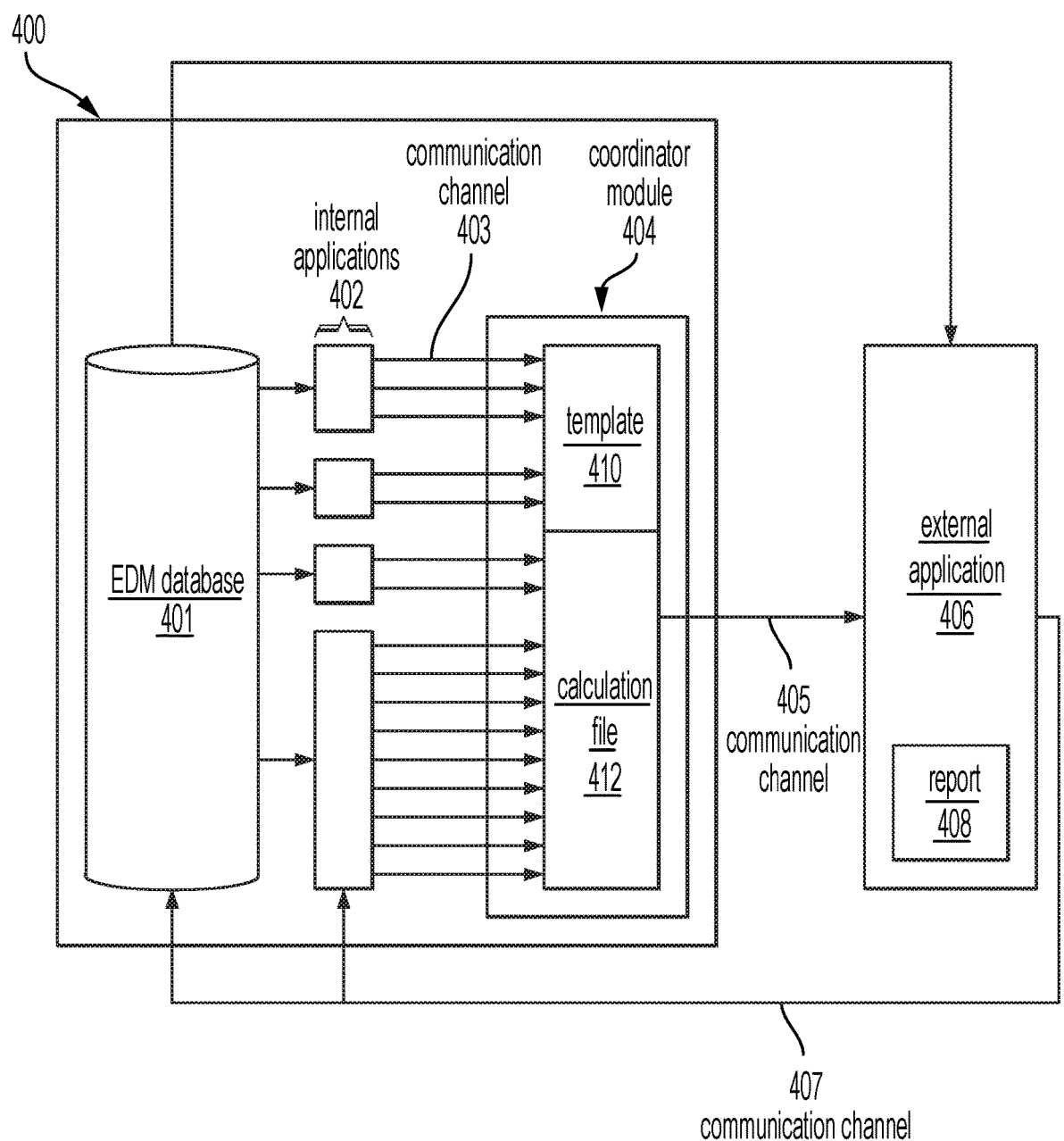
FIG. 4 is a block diagram of communication within an illustrative EDM data compatibility system.

FIG. 4 is a block diagram of an illustrative data compatibility system 400. The system includes an EDM database 401 and internal applications 402 that access the database 402 to obtain EDM data. The internal applications 402 collectively may have exclusive access to the EDM database 401, and the system 400 may use wired or wireless communication channels 403, 405, 407 to communicate internally and externally.

The system further includes a coordinator module 404, which may be implemented as a processor coupled to memory that stores templates of EDM data required by external applications 406. For example, for a particular external application 406 the coordinator module 404 may store a template including variable fields having blank, default, or null values to be populated with the relevant values from the EDM database. The coordinator module 404 may also store a data structure associating the variable fields with one or more particular internal applications 402. By referencing such a data structure, the coordinator module 404 may send requests for values for a particular well or set of wells, to fill the fields, to the referenced internal application 402. Such requests may be in structured query language ("SQL") format. Requests addressed to the same internal application 402 may be sent separately or bundled and sent together. The internal applications 402 receiving such requests may access the EDM in order to return the appropriate values over a communication channel 403, separately or bundled together, to the coordinator module 404. Next, the coordinator module 404 fills some or all of the fields of the template with the returned values from the various internal applications 402, creating a filled template 410.

The coordinator module 404 may also derive data required by the external application 406 from some of the returned values. For example, the coordinator module 404 may perform mathematical operations on the returned values to derive data more relevant to the external application 406 than the returned values. Such derived data may be stored in a calculation file 412 separate from the filled template 410.

Next, the coordinator module 404 formats the filled template 410 and calculation file 412 to be compatible with the external application 406, and sends 405 the formatted data to the external application 406 or a user of the external application 406. For example, the coordinator module 404 may format the filled template 410 and calculation file 412 into an extensible markup language ("XML") file, and the coordinator module 404 may send 407 the XML file to the external application 406 or the user of the external application 406. As another example, the coordinator module 404 may format the filled template 410 and calculation file 412 into a well-site information transfer standard markup language ("WITSML") file, and the coordinator module 404 may send the WITSML file to the external application 406 or the user of the external application 406 over another communication channel 405.

The external application 406 may import the formatted data automatically upon receipt, or a user may import the formatted data into the external application 406 using a function within the external application 406 rather than manually entering the values needed to populate the fields of the external application 406. After processing the formatted data, the external application 406 produces a report 408 of the processing results and sends the report 408 over a communication channel 407 to an internal application 402, which stores the report 408 in the EDM database 401. Alternatively, the external application 406 may send the report 408 directly to the EDM database 401 for storage. The report 408 may be stored as a static document, available to be retrieved later, or the report 408 can be used to update data previously stored in the EDM database 401.

Figure 5:
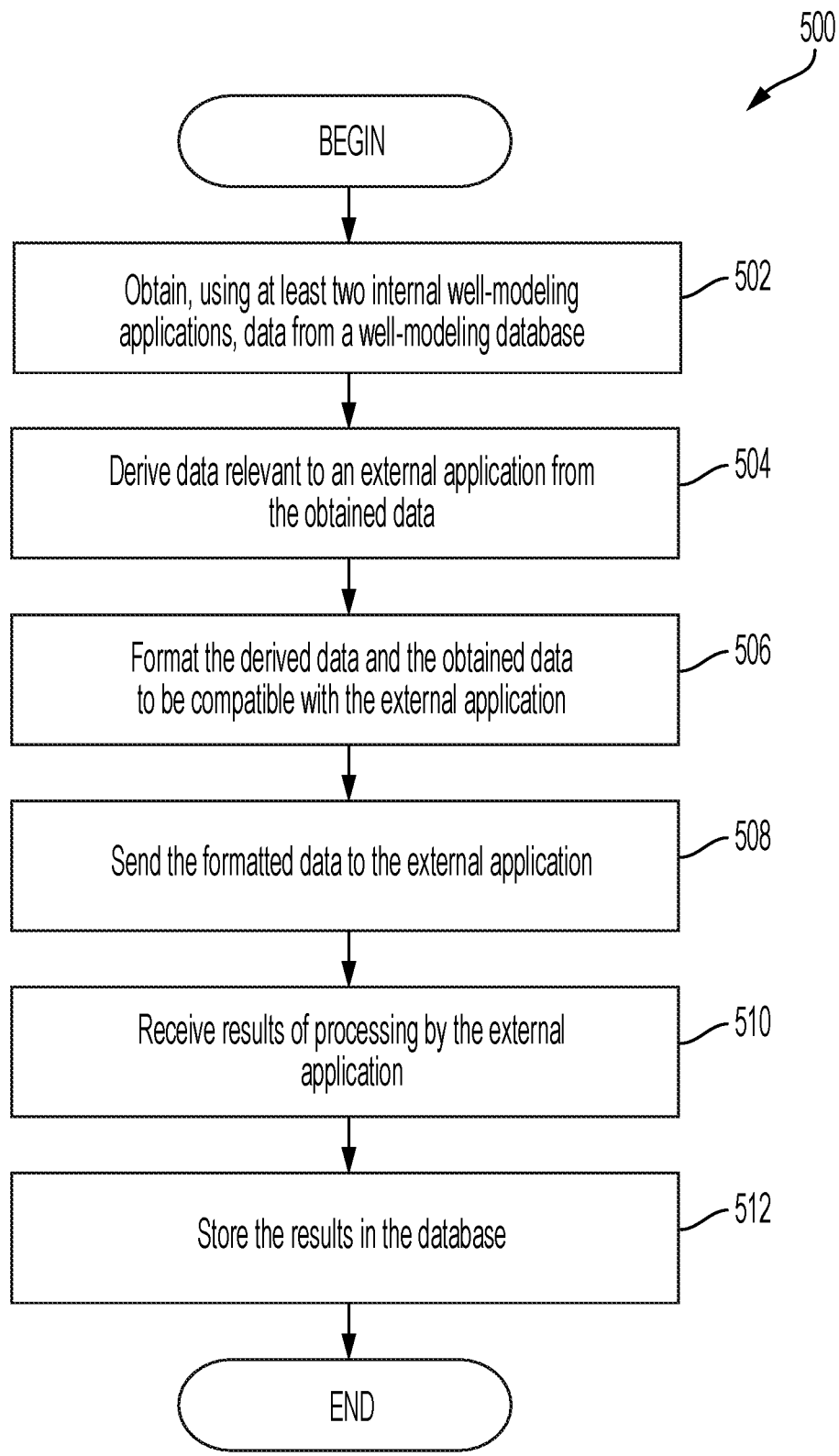
FIG. 5 is a flow diagram of an illustrative EDM data compatibility method.

FIG. 5 is a flow diagram of an illustrative data compatibility method that may be performed by an EDM compatibility system described above. At 502, the EDM compatibility system obtains, using multiple internal well-modeling applications, data from an EDM database. The data may include characteristics of specific wells such as hole size, casing size, water depth, measured depth, true vertical depth, and the like. The data may also include casing and cement characteristics such as the location of the string top or bottom, weight, grade, thread, outer diameter size, and the like. The data may also include fluid characteristics such as type, density, and the like. The data may also include pressures and test results such as pump pressure, leak-off test results, formation integrity test results, casing test results, and the like. Obtaining the data may include collecting the data as described with regard to FIG. 1 and FIG. 2, storing the data in the EDM database, sending requests for different pieces of the data to the internal applications, and returning the requested values in response to the requests.

At 504, the EDM compatibility system derives data relevant to an external well-analysis application from some of the returned values. Deriving the data may include performing mathematical operations on the returned values to make the derived data more relevant to the external application than the returned values.

At 506, the EDM compatibility system formats the derived data and some of the returned values to be compatible with the external application. Such formatting may include formatting the data into XML or WITSML. Specifically, the data should be formatted such that it may be imported by the external application to automatically populate fields in the external application with the formatted data. For example, a template for the external application may be created in conjunction with a vendor of the external application to ensure compatibility. The template may be filled with returned values, derived data, or both, and some or all of the template may be used as desired.

At 508, the EDM compatibility system sends the formatted data to the external application or a user of the external application. Sending the formatted data may include sending the XML or WITSML file to the external application or the user of the external application. The external application, or a user of the external application, may import the file into the external application to automatically populate fields with the formatted data. After processing the formatted data, the external application may generate a report of results and send the report to an internal application.

At 510, the EDM compatibility system receives results of processing the formatted data by the external application or the user of the external application. Receiving the results may include an internal application receiving the report generated by the external application.

At 512, the EDM compatibility system stores the results in the EDM database. Storing the results may include using at least one of the internal applications to import the results into the EDM database.

In at least one embodiment, a method includes obtaining, using multiple internal well-modeling applications, data from an engineer's data model (EDM) database. The method further includes deriving data relevant to an external well-analysis application from at least a first portion of the obtained data. The method further includes formatting the derived data and at least a second portion of the obtained data, relevant to the external application, to be compatible with the external application. The method further includes sending the formatted data to the external application or a user of the external application. The method further includes receiving results of processing the formatted data by the external application or the user of the external application. The method further includes storing the results in the EDM database.

In another embodiment, a system includes one or more storage devices storing an engineer's data model (EDM) database. The system further includes a first set of one or more processors running multiple internal well-modeling applications that access the EDM database to obtain data from the EDM database. The system further includes a coordinator module that derives data relevant to an external well-analysis application from at least a first portion of the obtained data and formats the derived data and at least a second portion of the obtained data to be compatible with the external application.

The following features may be incorporated into the various embodiments described above, such features incorporated either individually in or conjunction with one or more of the other features. Formatting the derived data and the second portion of the obtained data may include formatting the derived data and the second portion of the obtained data into extensible markup language ("XML"). Sending the formatted data may include sending an XML file to the external application or the user of the external application. Formatting the derived data and the second portion of the obtained data may include formatting the derived data and the second portion of the obtained data into well-site information transfer standard markup language ("WITSML"). Sending the formatted data may include sending a WITSML file to the external application or the user of the external application. Formatting the derived data and the second portion of the obtained data may include formatting the derived data and the second portion of the obtained data such that the formatted data may be imported by the external application to automatically populate fields in the external application with the formatted data. Formatting the derived data and the second portion of the obtained data may include populating a template created in conjunction with a vendor of the external application. Obtaining the data may include sending requests for different pieces of the data to the multiple internal applications. Storing the results may include using at least one of the internal applications to import the results into the EDM database. The internal applications may include application such as Compass, WellPlan, StressCheck, OpenWells, CasingWear, and Wellcat. The external application may include Well Barrier, Socrates, and Predict. The coordinator module may send the formatted data to the external application or a user of the external application. The first set of processors may receive results of processing the formatted data by the external application and store the results in the EDM database. The external application may access the EDM through an application programming interface ("API"). The internal applications collectively may have exclusive access to the EDM database, and the external application may not have access to obtain data from the EDM database. The coordinator module may format the derived data and the second portion of the obtained data into extensible markup language XML. The coordinator module may send an XML file to the external application or the user of the external application. The coordinator module may format the derived data and the second portion of the obtained data into WITSML. The coordinator module may send a WITSML file to the external application or the user of the external application.

While the present disclosure has been described with respect to a limited number of embodiments, those skilled in the art will appreciate numerous modifications and variations therefrom. It is intended that the appended claims cover all such modifications and variations.

What is claimed is:

1. A method comprising:
accessing a data structure that includes associations between (i) variable data fields in a data storage template and (ii) one or multiple internal well-modeling applications, wherein the variable data fields are configured to accept relevant values from a database, wherein the database includes well related data;
based on the associations in the data structure, obtaining data from the database through the multiple internal well-modeling applications;
deriving data relevant to an external application from at least a first portion of the obtained data;
filling the variable data fields of the data storage template with the derived data and a second portion of the obtained data to generate a filled template;
generating a formatted template by formatting the filled template to provide compatibility with the external application, wherein formatting the filled template involves formatting the derived data and at least the second portion of the obtained data relevant to the external application;
sending the formatted template to the external application or a user of the external application;
receiving processing results from the external application, wherein the processing results are generated by the external application processing the formatted template; and
storing the processing results in the database.

2. The method of claim 1, wherein formatting the derived data and the second portion of the obtained data comprises formatting the derived data and the second portion of the obtained data into extensible markup language ("XML").

3. The method of claim 2, wherein sending the formatted template comprises sending an XML file to the external application or the user of the external application.

4. The method of claim 1, wherein formatting the derived data and the second portion of the obtained data comprises formatting the derived data and the second portion of the obtained data into well-site information transfer standard markup language ("WITSML").

5. The method of claim 4, wherein sending the formatted template comprises sending a WITSML file to the external application or the user of the external application.

6. The method of claim 1, wherein formatting the derived data and the second portion of the obtained data comprises formatting the derived data and the second portion of the obtained data such that the formatted template may be imported by the external application to automatically populate fields in the external application with the formatted template.

7. The method of claim 1, wherein the data storage template was created at least in part with a vendor of the external application.

8. The method of claim 1, wherein obtaining the data comprises sending requests for different pieces of the data to the multiple internal well-modeling applications.

9. The method of claim 1, wherein storing the processing results comprises using at least one of the multiple internal well-modeling applications to import the processing results into the database.

10. The method of claim 1, wherein the multiple internal well-modeling applications are selected from the group consisting of Compass, WellPlan, StressCheck, OpenWells, CasingWear, and Wellcat.

11. The method of claim 1, wherein the external application is selected from the group consisting of Well Barrier, Socrates, and Predict.

12. A system comprising:
one or more processor devices; and
one or more non-transitory computer-readable mediums including instructions that are executable by the one or more processor devices to perform operations comprising:
accessing a data structure that includes associations between (i) variable data fields in a data storage template and (ii) one or multiple internal well-modeling applications, wherein the variable data fields are configured to accept relevant values from database, wherein the database includes well related data;
based on the associations in the data structure, obtaining data from the database through the multiple internal well-modeling applications;
deriving data relevant to an external application from at least a first portion of the obtained data;
filling the variable data fields of the data storage template with the derived data and a second portion of the obtained data to generate a filled template;
generating a formatted template by formatting the filled template, wherein formatting the filled template involves formatting the derived data and the second portion of the obtained data;
sending the formatted template to the external application or a user of the external application;
receiving processing results from the external application, wherein the processing results are generated by the external application processing the formatted template; and
storing the processing results in the database.

13. The system of claim 12, wherein the database is accessible by the external application through an application programming interface ("API").

14. The system of claim 12, wherein the operations further comprise generating the formatted template by formatting the derived data and the second portion of the obtained data into extensible markup language ("XML"), wherein the formatted template is an XML file.

15. The system of claim 14, wherein the operations further comprise sending the XML file to the external application or the user of the external application, the external application being configured to generate the processing results based on the XML file.

16. The system of claim 12, wherein the operations further comprise generating the formatted template by formatting the derived data and the second portion of the obtained data into well-site information transfer standard markup language ("WITSML") the formatted template being a WITSML file.

17. The system of claim 16, wherein the operations further comprise sending the WITSML file to the external application or the user of the external application, the external application being configured to generate the processing results based on the WITSML file.

18. The system of claim 12, wherein obtaining the data comprises sending requests for different pieces of the data to the multiple internal well-modeling applications.

19. The system of claim 12, wherein storing the processing results comprises using at least one of the multiple internal well-modeling applications to import the processing results into the database.

20. The system of claim 12, wherein formatting the filled template includes formatting the derived data and the second portion of the obtained data such that the formatted template is importable by the external application to automatically populate fields in the external application with formatted data from the formatted template.

* * * * *